A. Honrath,
Making Glass Bottles.
Nº 67,303.      Patented July 30, 1867.
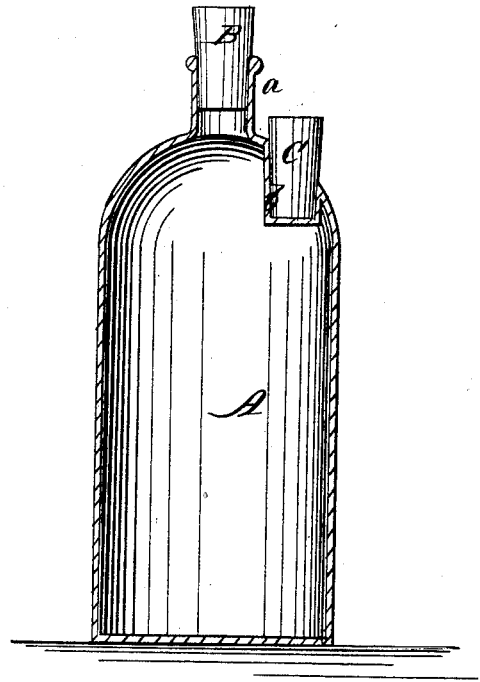
Witnesses
Alex F. Roberts
J. A. Service
Inventor
A. Honrath
per Munn & Co
Attorneys

United States Patent Office.

ALEXANDER HONRATH, OF NEW YORK, N. Y.

*Letters Patent No. 67,303, dated July 30, 1867.*

IMPROVED CORK RECEPTACLE FOR BOTTLES.

*The Schedule referred to in these Letters Patent and making part of the same.*

TO ALL WHOM IT MAY CONCERN:

Be it known that I, ALEXANDER HONRATH, of the city, county, and State of New York, have invented a new and improved Cork Receptacle for Bottles, &c.; and I do hereby declare that the following is a full, clear, and exact description thereof, which will enable others skilled in the art to make and use the same, reference being had to the accompanying drawings, forming a part of this specification.

This invention consists in forming or making bottles, vials, and other small vessels for holding liquids, and which are provided with cork stoppers, with a receptacle to hold a spare cork to be used in the event of the cork in the nozzle or neck of the vessel being broken or injured in drawing it out; the receptacle being also convenient to place the cork in when the same is drawn from the nozzle of the vessel in order to fill the latter or pour the contents therefrom. In the accompanying drawing a bottle is shown provided with my invention.

A is the bottle provided with the usual neck or nozzle, $a$, filled with a cork stopper, B. This bottle is blown or moulded with a cavity, $b$, in its upper part, to receive a spare cork, C, of the same dimensions as the one B in the neck or nozzle. From the above description it will be seen that in the event of the cork B being broken or injured in being withdrawn, the cork C may be used.

In putting up many liquids which are sold in bottles the corks are driven entirely into the neck or nozzle, or cut off even with the top thereof after being inserted, or driven in and then waxed at the top; and these corks, even if withdrawn uninjured, are not convenient or suitable to be afterwards used, and a proper cork, C, will, by my improvement, be ready at hand for use, and the cavity $c$ will be a convenient place to put the cork in when it is withdrawn from the neck or nozzle of the bottle for the purpose of filling the same or pouring the contents therefrom.

I do not confine myself to any particular locality for the cavity $b$; it may be at the bottom of the vessel or at one side of the upper part of the same, as shown in the drawing. The latter locality I prefer, as it would be undoubtedly the most convenient place for it. The invention is applicable to bottles of glass, earthenware, and all vials and other receptacles designed for holding liquids and provided with cork stoppers.

I claim as new, and desire to secure by Letters Patent—

The forming or manufacturing of bottles and other receptacles of glass, earthenware, or other material designed for holding liquids, and provided with cork stoppers, with a cavity, $b$, in order to hold a spare cork, substantially as shown and described.

The above specification of my invention signed by me this 26th day of June, 1867.

ALEX. HONRATH.

Witnesses:
   WM. F. McNAMARA
   ALEX. F. ROBERTS.